United States Patent Office 3,560,245
Patented Feb. 2, 1971

3,560,245
PAINTING POLYOLEFIN SUBSTRATES
Elihu J. Aronoff, Southfield, and Ernest O. McLaughlin, Detroit, Mich., assignors to Ford Motor Company, Dearborn, Mich., a corporation of Delaware
No Drawing. Filed Dec. 4, 1967, Ser. No. 687,495
Int. Cl. B44d 1/14, 1/50
U.S. Cl. 117—72
13 Claims

ABSTRACT OF THE DISCLOSURE

A process for painting polyolefin comprising substrates which comprises applying to the surface to be painted a coating material consisting essentially of a liquid compound having two or more unreacted vinyl groups per molecule, exposing this surface to ionizing radiation, applying to the resultant surface a coating of paint that is polymerizable by ionizing radiation and exposing the painted surface to ionizing radiation.

BACKGROUND OF THE INVENTION

Articles of manufacture formed from polyolefins, e.g. propylene homopolymers, ethylene homopolymers, ethylenepropylene copolymers, etc., have proven to be difficult to effectively paint. A primary problem has been poor adhesion between the paint and the polymeric substrate after the paint has been cured, i.e. polymerized, on such substrates.

SUMMARY OF THE INVENTION

It has been discovered that polyolefin comprising substrates can be painted and good adhesion obtained between paint and substrate if the substrate is first treated as hereinafter described. To at least a substantial portion of the surface to be painted, there is applied a coating material consisitng essentially of a liquid, multi-vinyl compound, i.e. an organic compound having two or more unreacted vinyl groups per molecule. The surface is then exposed to ionizing radiation, painted and the resultant painted surface is then exposed to ionizing radiation. Such multi-vinyl materials include, but not by way of limitation, hydrocarbons such as divinyl benzene, polyhydric alcohol esters of acrylic acid and methacrylic acid such as ethylene glycol dimethacrylate, trimethylolpropane trimethacrylate, tetraethylene glycol dimethacrylate, polyethylene glycol dimethacrylate and the corresponding acrylates, 1,3 butylene dimethacrylate, etc.

To enhance the appearance of the article when subsequently painted, it is advantageous to keep the application of this multi-vinyl material as thin and as even as is feasible. It is preferred to apply this material in solution with a volatile solvent. Advantageously such solvent is removed by evaporation by the time the surface is ready for irradiation or by the time the irradiation has been effected. Excellent results have been obtained by applying a discontinuous coating to the surface by spraying the surface with a fine mist of the material and terminating such spray before the spray particles on the surface are of sufficient number and size to coalesce to form a continuous coating. Since the volatile solvent is removed by evaporation, its composition is not critical. Hydrocarbon solvents, e.g. hexane, have proven highly satisfactory but many other solvents obviously can be used as is evidenced by the examples hereinafter set forth.

After the multi-vinyl material has been applied to the substrate and irradiated, a coating of paint curable by ionizing radiation is applied to the surface, e.g. by spray coating. The paint employed may be any of the radiation curable paints known to the art. It is preferred to use an alpha-beta olefinically unsaturated paint binder resin that can be cured with minimum exposure to ionizing radiation. The term "alpha-beta olefinically unsaturated resin" is used herein to mean an organic resin having olefinic unsaturation provided by alpha-beta olefinically unsaturated constituent monomers. Such paints may comprise a solution of resin in vinyl monomers wherein the resin contains at least about 0.5, advantageously 0.5 to 3, and preferably about 1 to about 2, units of alpha-beta olefinic unsaturation per 1,000 units molecular weight. The polymerizable units of the paint binder may also consist of homopolymerizable polymers having alphabeta olefinic unsaturation of suitable molecular weight to provide a typical paint viscosity. In the painting of three dimensional articles, the paint binder should have a viscosity low enough to permit rapid application thereof to the substrate in substantially even depth. Ordinarily, it should be high enough so that a 1 mil (.001 inch) film will hold on a vertical surface without sagging.

In this application, the term "paint" is meant to include finely divided pigment and/or particulate filler in a film-forming, resin comprising, binder, and the binder without pigment and/or particulate filler. Thus, the binder which is ultimately converted to a weather and wear resistant film can be all or virtually all that is used to form the film, or it can be a vehicle for pigmentary and/or particulate filler material.

For each of the aforementioned radiation steps of this method, we prefer to use polymerization effecting electrons having a potential in the range of about 100 to about 450, preferably about 200 to about 300, kv. Electron accelerators capable of providing a beam of electrons having average energies within this range are well known in the art and need not be further described here.

This invention will be more fully understood from the following illustrative examples.

EXAMPLE 1

Tests are performed with a variety of polyolefin 2″ x 4″ sheet stock panels, i.e. panels of polypropylene, asbestos filled polypropylene, pigment filled polypropylene, pigmented polypropylene, ethylene-propylene copolymer and high density polyethylene. Each panel is sprayed with ethylene glycol dimethacrylate, wiped off with absorbent paper and immediately subjected to ionizing radiation in the form of an electron beam issuing from an electron accelerator. The conditions of irradiation are as follows:

Potential: 275 kv.
Current: 25 milliamperes
Total dose: 18 megarads
Atmosphere: nitrogen These panels and control panels of the same materials are spray coated with acrylic resin comprising paint to an average depth of about 1 mil. Controls consist of untreated panels. The acrylic resin comprising paint is prepared from the following materials:

| | Mols | Weight, gms. |
|---|---|---|
| Methyl methacrylate | 3.0 | 300 |
| Ethyl acrylate | 5.0 | 500 |
| Glycidyl methacrylate | 1.4 | 199 |
| Methacrylic acid | 1.4 | 120 |
| Benzoyl peroxide | | 10 |
| Hydroquinone | | 1 |
| Xylene | | 1,000 |

A homogeneous mixture of the methyl methacrylate, ethyl acrylate, glycidyl methacrylate and the benzoyl peroxide is added dropwise over a four hour period to a reaction vessel containing the xylene at a temperature of 138° C. The resulting copolymer solution is allowed to cool to room temperature and a homogeneous mixture of the methacrylic acid and the hydroquinone is added to the reaction vessel. The temperature is slowly increased to 134° C. (approximately one hour) and the mixture is allowed to react for 1–3 hours at this temperature. The resin thus obtained has about 1.25 alpha-beta olefinic unsaturation units per 1,000 units molecular weight. When the reaction is complete, the major portion of the volatile solvent, xylene is removed. To the remainder of this resin solution, there is added 500 gms. methyl methacrylate. This resin solution, hereinafter termed Resin Solution A, has the following composition:

| | Wt. percent |
|---|---|
| Polymer | 59.44 |
| Methyl methacrylate | 26.44 |
| Xylene | 14.12 |

A paint is then prepared from the following materials in the manner hereinafter set forth.

| | Weight, gms. |
|---|---|
| Resin Solution A | 29.06 |
| Methyl methacrylate | 26.30 |
| Carbon black | 2.68 |
| Talc (MgO, SiO$_2$ and CaO) | 13.38 |
| Methyl methacrylate | 28.58 |

The resin solution, the first listed methyl methacrylate, the carbon black and the talc are mixed with agitation and the mixture is placed into a ceramic ball mill. The mill is rolled until pigment dispersion is obtained (average particle size below 0.001 in.). To this dispersed mixture is added the second listed methyl methacrylate and the paint is ready for use.

The painted panels are immediately irradiated. The conditions of irradiation are as follows:

Potential: 275 kv.
Current: 25 milliamperes
Total dose: 13 megarads
Atmosphere: Nitrogen The coatings thus provided upon the panels are subjected to conventional cross hatch adhesion testing. In this test, parallel lines 1/16 inch apart and at right angles thereto are inscribed on the panel. Adhesive cellophane tape is applied over the cross hatched area. The tape is removed and the cross hatched area is examined for adhesion failure. In this test, all of the panels coated in accordance with the method of this invention passed this test as evidenced by an adhesion loss of less than 10%. All controls failed the test as evidenced by excessive paint removal from the substrate with the tape.

EXAMPLE 2

The procedure of Example 1 is repeated except that the ethylene glycol dimethacrylate is allowed to remain on the panels for 1 minute before the panels are wiped preceding irradiation. The results obtained are essentially the same as in Example 1.

EXAMPLE 3

The procedure of Example 1 is repeated except that the irradiated ethylene glycol dimethacrylate is allowed to remain on the panels for 24 hours before the panels are painted. The results obtained are essentially the same as in Example 1 indicating that the time of the irradiation of the dimethacrylate on the polyolefin solid substrate prior to painting is unimportant.

EXAMPLE 4

The procedure of Example 1 is repeated except that trimethylolpropane trimethacrylate is substituted for the ethylene glycol dimethacrylate and control panels are not made. In the same adhesion test, the trimethylolmethacrylate provides even better adhesion than that provided by the ethylene glycol dimethacrylate.

EXAMPLE 5

The procedure of Example 1 is repeated employing total dosages of 10, 20, and 30 megarad. All tests pass the cross hatch adhesion test.

EXAMPLE 6

The procedure of Example 1 is repeated with the following changes. Trimethylolpropane trimethacrylate is employed in lieu of ethylene glycol dimethacrylate and this trimethacrylate is applied as spray mist so as to form a discontinuous coating upon the test surfaces of the substrates. The surfaces are not wiped when this type of application is used. The mist comprises equal parts of the trimethacrylate and a volatile solvent that is essentially removed by evaporation by the end of the irradiation period. The solvents thus used are hexane, isooctane, chloropentane and an even mixture of hexane and chlorobenzene. Continuity of film adhesion is found to be even better where this discontinuous mist coating is applied than where the surface is coated and wiped.

EXAMPLE 7

The procedure of Example 6 is repeated with the difference that divinyl benzene is substituted for the trimethylolpropane trimethacrylate and applied with equal parts of hexane as a discontinuous spray mist coating over the test surfaces. Very good adhesion of paint to the substrate is obtained.

EXAMPLE 8

The procedure of Example 6 is repeated with the difference that tetraethylene glycol dimethylacrylate is substituted for the trimethylolpropane trimethacrylate and the dimethacrylate is applied with hexane as a discontinuous spray mist coating over substantially all of the test surfaces. Very good adhesion of paint to the substrate is obtained.

EXAMPLE 9

The procedure of Example 6 is repeated with the difference that polyethylene glycol dimethacrylate is substituded for the trimethylolpropane trimethacrylate. Very good adhesion of paint to the substrate is obtained.

EXAMPLE 10

The procedure of Example 6 is repeated except that trimethylolpropane triacrylate is used in lieu of trimethylolpropane trimethacrylate and the panels include a low density polyethylene panel in addition to panels of the type used in Example 1. Very good adhesion of paint to substrate is obtained.

EXAMPLE 11

The procedure of Example 6 is repeated with the difference that ethylene glycol diacrylate is used in lieu of trimethylolpropane dimethacrylate. Very good adhesion of paint to substrate is obtained.

EXAMPLE 12

The procedure of Example 6 is repeated with additional controls prepared by irradiating the panels with a total dose of about 10 megarad. These controls demonstrate improved adhesion with respect to the completely untreated panels but significantly less adhesion than the panels sprayed with trimethylolpropane dimethacrylate prior to such irradiation.

EXAMPLE 13

The procedure of Example 12 is repeated except that divinyl benzene is substituted for the trimethylolpropane dimethacrylate and like results are obtained.

EXAMPLE 14

The procedure of Example 1 is repeated except that in lieu of the acrylic resin comprising paint employed in Example 1, there is used a polyester resin comprising paint. This resin is prepared from the following materials in the manner hereinafter set forth:

To a reaction vessel are charged 14.7 parts by weight maleic anhydride, 72.3 parts by weight tetrahydrophthalic anhydride, 75.0 parts by weight neopentyl glycol and about 0.25 part by weight dibutyl tin oxide. The charge is heated to 340° F. and held at this temperature for 1 hour. The temperature of the charge is then raised to a temperature of 440° F. and maintained at such temperature until the acid number of the resulting resin is below about 20. The excess glycol and water are removed by vacuum and when the acid number is below about 10, there is added about 0.03 part by weight hydroquinone. The charge is allowed to cool to about 180° F. and there are added 37.0 parts by weight styrene. A binder solution is prepared using 50 parts by weight of this material and 50 parts by weight of styrene.

The polyester resin comprising paint demonstrates excellent adhesion to the substrate. Acrylic type paints, however, provide a more severe test in attempting to achieve adhesion to a polyolefin substrate.

It will be understood by those skilled in the art that modifications can made within the foregoing examples within the scope of this invention as hereinbefore described and hereinafter claimed.

We claim:

1. In a method of painting a polyolefin substrate selected from polyethylene, polypropylene and ethylene-propylene copolymers which comprises applying to a surface of said substrate an olefinically unsaturated paint binder resin and exposing said resin to ionizing radiation while on said surface, the improvement which comprises the combination of first applying to said surface an organic liquid monomer having at least two vinyl groups per molecule and selected from the group consisting of hydrocarbons, acrylates and methacrylates and second exposing the monomer to ionizing radiation upon said surface prior to the application of the said paint binder resin.

2. The method of claim 1 wherein said ionizing radiation is an electron beam having average potential in the range of about 100 to about 450,000 electron volts.

3. The method of claim 1 wherein said organic liquid monomer having at least two vinyl groups per molecule is divinyl benzene.

4. The method of claim 1 wherein said organic liquid monomers having at least two vinyl groups per molecule is an ester formed by the reaction of a polyhydric alcohol and acrylc acid.

5. The method of claim 1 wherein said organic liquid monomer having at least two vinyl groups per molecule is an ester formed by the reaction of a polyhydric alcohol and methacrylic acid.

6. The method of claim 1 wherein said substrate is polypropylene.

7. The method of claim 1 wherein said substrate is polyethylene.

8. The method of claim 1 wherein said substrate is ethylene-propylene copolymer.

9. The method of claim 1 wherein said organic liquid monomer is applied to said substrate while in solution with a volatile solvent.

10. In a method of painting a polyolefin substrate selected from polyethylene, polypropylene and ethylene-propylene copolymers which comprises applying to a surface of said substrate a paint binder solution of an alpha-beta olefinically unsaturated paint binder resin in vinyl monomers and curing said paint by ionizing radiation, the improvement which comprises the combination of first applying to said surface an organic liquid monomer consisting essentially of carbon, hydrogen and oxygen, having at least two vinyl groups per molecule, and selected from the group consisting of hydrocarbons, acrylates and methacrylates and second exposing the monomer to ionizing radiation upon said surface prior to the application of the said paint binder resin.

11. The method of claim 10 wherein said alpha-beta olefinically unsaturated paint binder resin is selected from acrylic resins and polyester resin and said vinyl monomers are monovinyl monomers selected from monovinyl hydrocarbons and esters of a monohydric alcohol and acrylic or methacrylic acid.

12. The method of claim 10 wherein said organic liquid monomer is dinvinyl benzene.

13. The method of claim 10 wherein said organic liquid monomer is an ester of an alcohol having two or more hydroxyl groups and acrylic or methacrylic acid.

References Cited

UNITED STATES PATENTS

| 3,188,165 | 6/1965 | Magat et al. | 117—62 |
| 3,286,322 | 11/1966 | Sneary | 117—138.8 |
| 3,050,413 | 8/1962 | Sites et al. | 117—62 |
| 3,068,122 | 12/1962 | Cline et al. | 117—62 |
| 3,140,194 | 7/1964 | Gagliardi | 117—138.8 |
| 3,188,228 | 6/1965 | Magat et al. | 117—62 |
| 3,198,692 | 8/1965 | Bridgeford | 117—138.8 |
| 3,427,184 | 2/1869 | Mauro et al. | 117—138.8 |
| 3,449,154 | 6/1969 | Katz | 117—138.8 |
| 3,464,922 | 9/1969 | Bernholz et al. | 117—138.8 |
| 3,132,966 | 5/1964 | Hughes et al. | 117—93.31 |

FOREIGN PATENTS

| 801,479 | 9/1958 | Great Britain | 117—93.31 |

WILLIAM D. MARTIN, Primary Examiner

M. SOFOCLEOUS, Assistant Examiner

U.S. Cl. X.R.

117—93.31, 138.8; 204—159.19